United States Patent [19]

Chambers, Jr. et al.

[11] 4,130,735
[45] Dec. 19, 1978

[54] LOOP EXTENDER

[75] Inventors: Charles W. Chambers, Jr., Amherst; Frederick J. Kiko, Lorain; Robert J. Kretschmann, Elyria, all of Ohio

[73] Assignee: Lorain Products Corporation, Lorain, Ohio

[21] Appl. No.: 786,563

[22] Filed: Apr. 11, 1977

[51] Int. Cl.² ............................................. H04Q 1/30
[52] U.S. Cl. ................................................ 179/16 F
[58] Field of Search .......................... 179/16 EA, 16 F

[56] References Cited

U.S. PATENT DOCUMENTS

| 3,508,009 | 4/1970 | Henry et al. | 179/16 F |
| 3,763,320 | 10/1973 | Chambers, Jr. | 179/16 F |
| 3,781,480 | 12/1973 | Roge | 179/16 F |

Primary Examiner—Kathleen H. Claffy
Assistant Examiner—Randall P. Myers

Attorney, Agent, or Firm—Strauch, Nolan, Neale, Nies & Kurz

[57] ABSTRACT

A loop extender for adding a series-aiding boost voltage to a subscriber loop of a telephone system and having a d.c. boost voltage supply, an amplifier circiit having an active device connecting the voltage supply in series with a conductor of said loop for applying to the loop a magnitude of boost voltage that is dependent upon the gain of the amplifier circuit, and a further circuit, including a feedback for the amplifier circuit, for controlling the gain of said amplifier circuit in such a way that said gain is increased to cause an increase in the applied boost voltage in response to a rise in the magnitude of the loop current to a first predetermined threshold and/or in such a way that said gain is decreased to cause a decrease in the applied boost voltage in response to a decrease in the magnitude of the loop current to a second predetermined threshold.

26 Claims, 5 Drawing Figures

LOOP EXTENDER

FIELD OF INVENTION

This invention relates to improvements in loop extenders (also referred to as line extender signalling units in some countries or voltage boosters) for telephone communication systems.

BACKGROUND

Loop extenders (such as the one described in U.S. Pat. No. 3,763,320 which issued on Oct. 2, 1973 to C. W. Chambers) are used to increase the signalling range for originating the terminating calls on relatively long subscriber lines by adding a series-aiding boost voltage to either or both sides of the line, thus effectively increasing the loop supply voltage. Subscriber loop facilities of different types requiring such treatment, however, have various different operating conditions that must be accommodated to ensure satisfactory operation.

SUMMARY AND OBJECTS OF INVENTION

An object of this invention, therefore, is to provide a novel loop extender or voltage booster that is capable of accommodating a variety of different loop conditions to allow its use in different subscriber loop facilities such as coin pay loop facilities and private subscriber loop facilities.

According to the preferred embodiment of this invention a loop extender for adding a series-aiding boost voltage to a subscriber loop of a telephone system comprises a d.c. boost voltage supply, an amplifier circuit providing for the connection of the voltage supply in series with a conductor of the loop to insert the boost voltage, a loop current sensor for applying a d.c. control signal that is proportional to the loop current to the amplifier circuit's input, a feedback connected between the amplifier's circuit's input and output for applying to the amplifier circuit's input a feedback signal that varies with the inserted boost voltage such that the inserted boost voltage is controlled as a function of the feedback and control signals, and a current diverting circuit connected to the feedback.

A rise in loop current above a first pre-selected threshold has the effect of causing the current diverting circuit to divert feedback current from the feedback thereby attenuating the feedback signal. Attenuation of the feedback signal causes an increase in the amplifier circuit's gain from a low value to a high value to cause a corresponding increase in the inserted boost voltage. A decrease in loop current below a second pre-selected threshold has the effect of causing the current diverting circuit to terminate the diversion of feedback current with the result that the amplifier circuit's gain is decreased to its low value to effect a corresponding decrease in the inserted boost voltage.

In the preferred embodiment, the second loop current threshold is selected to be greater than the first loop current threshold. This dual threshold operation enables the effective removal of the boost voltage at a loop resistance that is less than that used to provide coin signalling in certain coin pay loop facilities where it is desirable to have the boost voltage removed during the coin signalling operation.

According to this invention the amplifier circuit has an output stage connected intermediate the d.c. boost voltage power supply and a conductor of the subscriber loop to insert a d.c. control voltage in series opposing relationship with the power supply's constant output voltage so that the inserted boost voltage is equal to the algebraic summation of the power supply voltage and d.c. control voltage less any IR drops existing between the terminals across which the inserted boost voltage is established. This opposing d.c. control voltage is varied in such a way that the inserted boost voltage will (a) increase gradually as the loop current increases from a low value to the first pre-selected threshold mentioned above, (b) rise sharply as the loop current increases from the first threshold to a first predetermined value so that that change in boost voltage per unit increase in loop current between the first threshold and the first predetermined value is much greater than the boost voltage change per unit increase in loop current below the first threshold, (c) decrease gradually as the loop current increases from the first predetermined value to a second predetermined value, and (d) decrease rapidly as the loop current increases above the second predetermined value such that the change in boost voltage per unit increase in loop current above the second predetermined value is significantly greater than the boost voltage change per unit increase in loop current between the first and second predetermined values. As the loop current continues to increase above the second predetermined value mentioned above, the inserted boost voltage ultimately will become zero and then will reverse polarity to oppose, rather than aid, the central office battery voltage.

Regarding another feature of this invention, it is desirable to equip the loop extender with a low pass filter for rejecting the voice signals and a.c. ringing signals to keep the loop extender from responding to these signals. Setting the filter's cutoff frequency low enough to reject the a.c. ringing signal, however, slows the response of the voltage booster circuit in the loop extender to changes in loop current.

To overcome this problem, the loop extender may advantageously be provided with a novel ring disabler which effectively lowers the cutoff frequency of the low pass filter by adding a resistance thereto to reject the a.c. ringing signal only during the periods when the a.c. ringing signal voltage is applied to the line. When the ringing signal is not present, the filter's cutoff frequency will be higher to provide the loop extender with a faster response to changes in loop current.

With the foregoing in mind another object of this invention is to provide a novel loop extender in which the magnitude of inserted boost voltage is under the control of an amplifier, and in which a further circuit, including a feedback for the amplifier increases the boost voltage significantly by stepping up the amplifier's gain from a low value to a high value when the loop current rises above a first pre-selected threshold and also decreases the boost voltage significantly by stepping down the amplifier's gain from its high value to its low value when the loop current decreases below a second pre-selected threshold.

Another object of this invention is to provide a novel loop extender in which a boost voltage circuit had a feedback amplifier for establishing a feedback signal that varies with the magnitude of inserted boost voltage, and in which the boost voltage circuit controls the magnitude of inserted boost voltage as a function of the feedback signal and also as a function of the magnitude of subscriber loop current.

Still another object of this invention is to provide a novel loop extender wherein a variable d.c. control voltage is inserted in series opposing relationship with the constant voltage of a boost voltage supply source to cause the applied boost voltage to vary in a predetermined manner as the subscriber loop current increases and decreases.

A further object of this invention is to provide a novel loop extender in which inserted boost voltage is varied by a voltage booster circuit in response to variations in loop current, in which a low pass filter is provided with a cutoff that is low enough to block application of central office-transmitted a.c. ringing signals to the voltage boost circuit upon application of the ringing signal voltage, and in which the filter's cutoff is raised in response to the removal of the ringing voltage to increase the response of the voltage circuit to variations in loop current during intervals in which the ringing signal is not present.

The above and other features of the invention are illustrated, by way of example in the accompanying drawings, in which.

DETAILED DESCRIPTION

Figure 1:
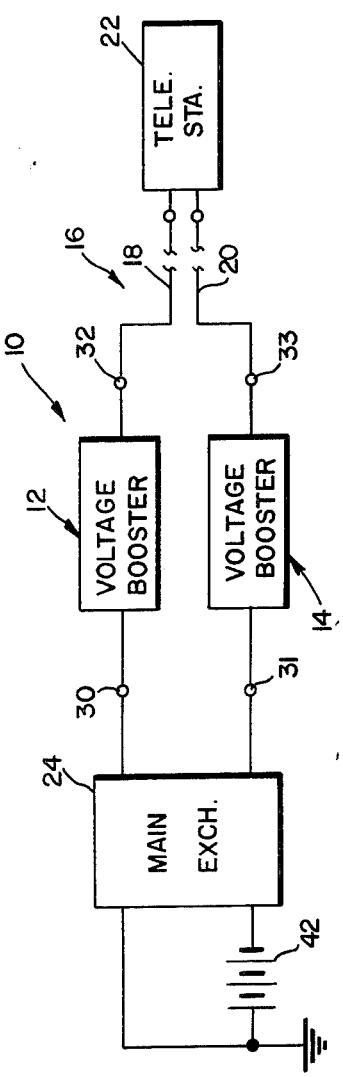
FIG. 1 is a schematic diagram of a loop extender according to one embodiment of this invention.
Figure 2:
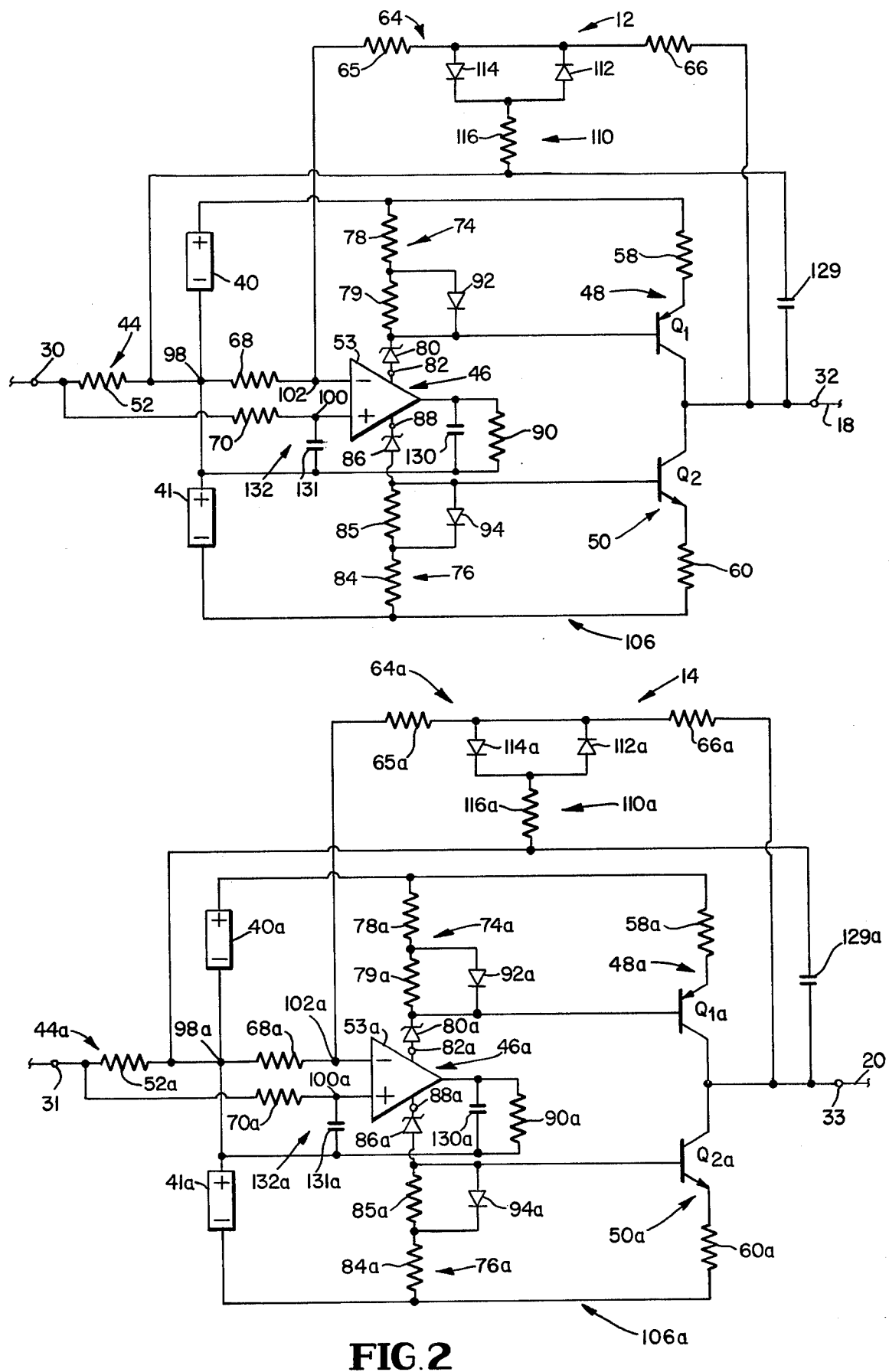
FIG. 2 is a schematic circuit diagram of the booster circuits shown in FIG. 1.

Referring to FIGS. 1 and 2, one embodiment of a loop extender incorporating the principles of this invention is shown to comprise a pair of voltage booster circuits 12 and 14 for supplying boosted battery voltage to a subscriber loop or line 16. The subscriber loop is typically a two-conductor transmission line having a pair of conductors 18 and 20 (usually referred to as the tip and ring conductors) for connecting a telephone station 22 to a main exchange or central office 24.

In the illustrated embodiments, the loop 16 is connected through the voltage booster circuits 12 and 14 to the usual equipment in the central office. Booster circuits 12 and 14 are in series with conductors 18 and 20, respectively.

The loop extender of this invention is especially designed to accommodate a variety of different loop operating conditions and thus may be used in conjunction with different kinds of telephone stations, such as coin pay station of the prepay or postpay type and non-coin pay or private subscriber telephone stations. The transmission line connecting the telephone station to the central telephone office is identified herein as the subscriber loop or simply the subscriber line whether the telephone station be of coin pay type or the private subscriber type.

In FIG. 1, the terminals of the central office are indicated at 30 and 31, and the terminals representing the central office terminations of the subscriber loop 16 are indicated at 32 and 33. Booster circuit 12 is connected between terminals 30 and 32, and booster circuit 14 is connected between terminals 31 and 33.

While the loop extender of this invention is shown to be connected at the central office terminals 30 and 31, it will be understood that, in practice, it may be located anywhere along the transmission path.

As shown in FIG. 2, booster circuits 12 and 14 are the same. Accordingly, like reference characters have been applied to designate corresponding devices and components in the two circuits, with the exception that the letter "a" has been added as a postscript to the reference characters for booster circuit 14 to distinguish them from the reference characters used for booster circuit 12.

Since booster circuits 12 and 14 are the same, only circuit 12 will be described in detail. It will be understood, however, that the description pertaining to circuit 12 is equally applicable to booster circuit 14.

As shown in FIG. 2, booster circuit 12 includes two d.c. boost voltage supplies 40 and 41. Voltage supply 40 serves to additively increase the magnitude of d.c. loop or subscriber line current when the d.c. voltage at terminal 30 is positive with respect to terminal 32. Voltage supply 41 serves to additively increase the magnitude of subscriber loop current when the d.c. voltage at terminal 30 is negative with respect to terminal 32. Operation of booster 12 is such that the boost voltage supply (40 or 41) selected to insert boost voltage will be in series-aiding relationship with the d.c. voltage that is applied by central office battery (indicated at 42 in FIG. 1) across terminals 30 and 31.

In addition to the d.c. boost voltage supplies 40 and 41, boost circuit 12 includes a loop current sensor 44, a controller or voltage amplifying control circuit 46 and a pair of variable conducting active devices 48 and 50.

The loop current sensor 44 serves to sense the magnitude of the d.c. loop current flow. In the illustrated embodiment sensor 44 takes the form of a resistor 52.

In its conducting state, the variable conducting device 48 serves to complete a path for conducting loop current through the boost voltage supply 40 from terminal 30 to terminal 32. Similarly, when variable conducting device 50 is in its conducting state, it will complete a current path for conducting loop current from terminal 32 to terminal 30 by way of the boost voltage supply 41. In the illustrated embodiments, device 48 takes the form of a PNP power transistor Q1, and device 50 is an NPN power transistor Q2.

Control circuit 46 is shown to comprise an operational amplifier 53 in the illustrated embodiments and determines which of the two transistors Q1 and Q2 will be in its conducting state, depending upon the direction of loop current flow through current sensor 44. Additionally, control circuit 46 responds to the sensed magnitude of the d.c. loop current flow to determine the extent to which the conducting power transistor will conduct. Accordingly, control circuit 46 is responsive to the direction and magnitude of loop current to determine which power transistor (Q1 or Q2) conducts upon loop closure and the extent to which it conducts.

The extent to which transistor Q1 conducts will determine the magnitude of boost voltage inserted into or applied to the subscriber line by the boost voltage supply 40. The extent to which transistor Q2 conducts will determine the magnitude of the boost voltage applied to the subscriber line by the boost voltage supply 41.

When the central office terminal 30 is positive with respect to the central office terminal 31, loop current, upon closure of loop 16, will flow clockwise in loop 16 as viewed from FIG. 1. For this direction of current flow, loop current will flow down conductor 18 from the central office and will return to the central office by way of conductor 20. To accommodate this direction of loop current flow, control circuit 46 responds to the direction of loop current flow to establish significant conduction of transistor Q1 and turn off transistor Q2. Additionally, control circuit 46a, in booster circuit 14, will respond to the sensed direction of loop current flow to establish significant conduction of transistor Q2a and to turn transistor Q1a off. For these circuit conditions the current path completed by transistors Q1 and Q2a will enable loop current passing out of the central office from terminal 30 to flow through resistor 52, boost voltage supply 40 (from the negative to the positive terminals of the supply), through an emitter resistor 58, through the emitter and collector of transistor Q1, through terminal 32 and down conductor 18. The loop current returned from the loop closure flows up conductor 20 towards the central office and through terminal 33, the collector and emitter of resistor Q2a, an emitter resistor 60a, the boost voltage supply 41a (negative to positive), the current sensing resistor 52a and terminal 31 to the central office.

For the foregoing direction of loop current flow it is clear that booster circuits 12 and 14 respectively insert voltage supplies 40 and 41a into the active circuit. The polarities of voltage supplies 40 and 41a are in series power-aiding relationship to the clockwise direction of loop current flow. The magnitude of loop current will consequently be increased by the action of booster circuits 12 and 14.

For the opposite central office battery polarity, making terminal 31 positive with respect to terminal 30, loop closure results in loop current flow in conductor 20 that is away from the central office and loop current flow in conductor 18 that is towards the central office. For this direction of loop current flow, control circuit 46 establishes significant conduction of transistor Q2 and turns off transistor Q1. Control circuit 46a, on the other hand, establishes significant conduction of transistor Q1a and turns off transistor Q2a.

For these operating conditions, the counterclockwise flow of d.c. loop current (as viewed from FIG. 1) through loop 16 is away from the central office at terminal 31 to flow serially through the current sensing resistor 52a, the boost voltage supply 40a, the emitter resistor 58a for transistor Q1a, the emitter and collector of transistor Q1a, terminal 33 and conductor 20. The d.c. loop current is returned to the central office through conductor 18, the collector and emitter of transistor Q2, the emitter resistor 60, the boost voltage supply 41, the current sensing resistor 52, and the central office terminal 30.

Thus, for the counterclockwise flow of loop current, booster circuit 14 operates to insert the boost voltage supply 40a in series-aiding relationship to the current flowing away from the central office, and booster circuit 12 operates to insert the boost voltage supply 41 in series-aiding relationship to the central office. Booster circuits 12 and 14 therefore operate to additively increase the loop current regardless of the direction of loop current flow.

The employment of both booster circuit 12 and 14, one in series with each of the subscriber loop conductors 18 and 20, assures that the inserted boost voltage is evenly distributed between the two sides of the subscriber line. Providing a booster circuit in series with each of the subscriber loop conductors also assures boosted voltage for an operating condition where current flows in one of the conductors 18 and 20 and not the other. If these considerations are not applicable to the particular subscriber loop in which the loop extender of this invention is employed, it will be appreciated that the desired boost voltage may be supplied by connecting only one of the booster circuits, such as booster circuit 12, in series with only one of the subscriber loop conductors.

In this invention, the combined circuit of amplifier 53 and transistors Q1 and Q2 is provided with a resistive negative feedback 64. Feedback 64 comprises a pair of resistors 65 and 66 connected in series between the inverting input terminal of amplifier 53 and terminal 32 which may be regarded as one of the two operating terminals of booster circuit 12. Negative feedback 64 serves to apply, to the inverting input of amplifier 53, a feedback signal which varies in accordance with the inserted boost voltage at terminal 32.

As shown in FIG. 2, an input resistor 68 for amplifier 53 and the current sensing resistor 52 are connected in series between the amplifier's inverting input and terminal 30 which may be regarded as the other operating terminal of booster 12. Another resistor 70 is connected between terminal 30 and the non-inverting input terminal of amplifier 53 to feed the amplifier's non-inverting input. Resistors 52, 68 and 70 are connected in a closed path between the inverting and non-inverting input terminals 102 and 100 respectively of amplifier 53 and determine the input voltage applied to the amplifier. As no significant signal current flows into the input terminals of an operational amplifier, no signficant voltage is established across input resistor 70. Thus, a voltage proportional to the current flowing through feedback 64 is established across input resistor 68. Since this latter current is proportional to the inserted boost voltage, the voltage across resistor 68 is proportional to the inserted boost voltage. The voltage drop across resistor 52, on the other hand, will be proportional to the magnitude of loop current.

Figure 3:
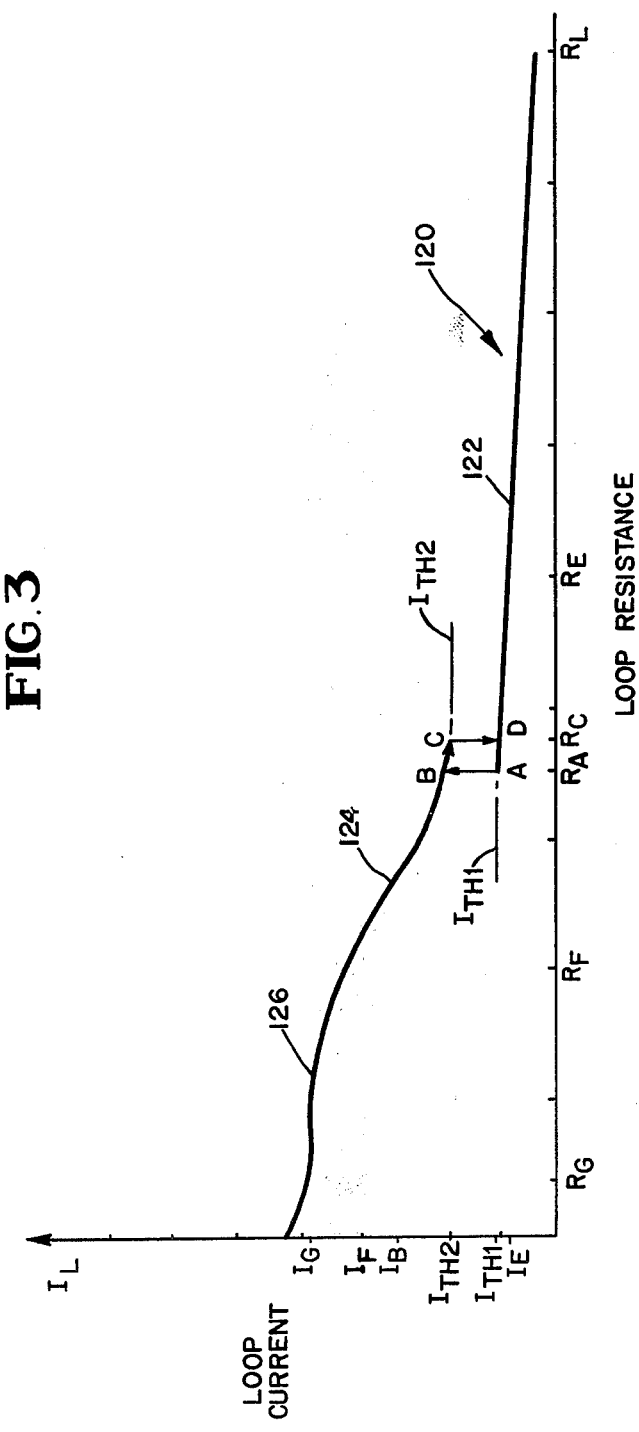
FIG. 3 is a plot of the loop current vs. loop resistance characteristics for the loop extender of this invention.
Figure 4:
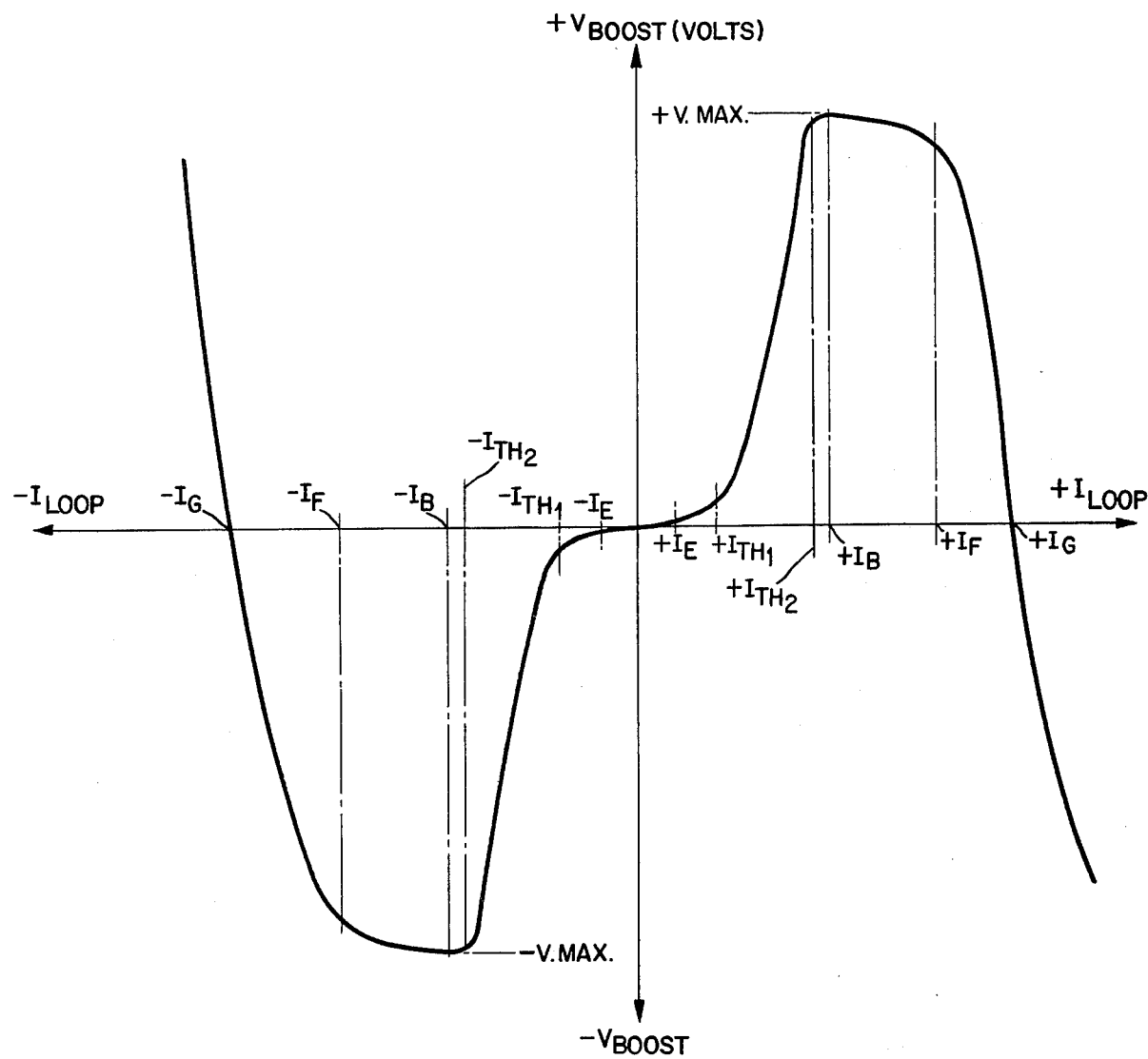
FIG. 4 is a graph showing the inserted boost voltage established by the loop extender as a function of the loop current.

In addition, the direction of current flow through resistor 68 is opposite to the direction of current flow through current sensing resistor 52 up to a maximum loop current that is indicated at $I_G$ in FIGS. 3 and 4. Thus, the input voltage to amplifier 53 comprises a signal which is proportional to the loop current reduced by a signal proportional to the inserted boost voltage for values of loop current up to $I_G$.

In the embodiment shown in FIG. 2, the negative terminal of boost voltage supply 40 and the positive terminal of the boost voltage supply 41 are both connected to a common junction 98 between resistors 52 and 68. The positive terminal of supply 40 is connected through resistor 68 to the emitter of transistor Q1, and the negative terminal of supply 41 is connected through resistor 60 to the emitter of transistor Q2. The collectors of transistors Q1 and Q2 are tied together and connected to terminal 32 as shown.

From the foregoing circuit description it will be appreciated that when conduction of transistor Q1 inserts the boost voltage, the magnitude of boost voltage ($V_{BOOST}$) applied across terminals 32 and 98 will be the voltage ($V_{40}$) supplied by the voltage supply 40 minus the sum of the collector emitter voltage, $V_{CE_1}$, of transistor Q1 and the IR drop, $V_{58}$, across resistor 58. Accordingly, $V_{BOOST} = V_{40} - (V_{CE_1} + V_{58})$. From this relationship it is apparent that the inserted boost voltage, $V_{BOOST}$, may be varied by varying the collector-emitter voltage of transistor Q1. The collector-emitter voltage of transistor Q1 may be varied by varying the base bias for transistor Q1, and the transistor's base bias, in turn, is under the control of amplifier 53.

By the same token, it will be appreciated that when transistor Q2 conducts to insert the boost voltage, the magnitude of the boost voltage across terminals 32 and 98 will be the supply voltage, $V_{41}$, produced by the boost voltage supply 41 minus the sum of the collector-emitter voltage of transistor Q2 and the IR drop across resistor 60. Varying the base bias for transistor Q2 under the control of amplifier 53 thus varies the inserted boost voltage across terminals 32 and 98 by varying the collector-emitter voltage of transistor Q2.

From the description thus far, it is clear that transistor Q1 serves to control the magnitude of boost voltage inserted by the boost voltage supply 40, and transistor Q2 serves to control the magnitude of boost voltage inserted by boost voltage supply 41. Amplifier 53 serves as a control device together with two base biasing networks 74 and 76 (see FIG. 2) to control the conduction of transistors Q1 and Q2.

To accomplish this, biasing network 74 comprises a pair of series connected resistors 78 and 79 and is connected in series with a Zener diode 80 between the positive side of voltage supply 40 and the positive power input 82 of amplifier 53 to feed the amplifier's positive input. Similarly, biasing network 76 also comprises a pair of series connected resistors 84 and 85 and is connected in series with another Zener diode 86 between the negative side of voltage supply 41 and the negative power input 88 of amplifier 53 to feed the amplifier's negative power input. The output of amplifier 53 is connected through a load resistor 90 to the common junction 98. Zener diodes 80 and 86 serve to limit the relatively high potential across voltage supplies 40 and 41 to the proper supply desired across the power inputs of amplifier 53.

Bias for transistor Q1 is obtained by connecting the transistor's base to the junction between diode 80 and resistor 79 and also through a diode 92 to the junction between resistors 78 and 79. Similarly, bias for transistor Q2 is obtained by connecting the base of transistor Q2 to the junction between diode 86 and resistor 85 and also through a diode 94 to the junction between resistors 84 and 85.

When flow of loop current is from terminal 30 to terminal 32, making the voltage at terminal 30 more positive with respect to the voltage at the common terminal junction 98, the voltage at the non-inverting input terminal 100 of amplifier 53 will be more positive than the voltage at amplifier's inverting input terminal 102. As a result, amplifier 53 will draw operating current from the positive side of supply 40 and not the negative side of supply 41 to establish a positive voltage at its output. This operating current provides forward bias for transistor Q1 and flows through biasing network 74, Zener diode 80, amplifier 53 and resistor 90 to the common terminal junction 98. For this operating condition no base current is supplied to transistor Q2 because no operating current of any consequence is drawn by amplifier 53 through its negative power lead 88. Transistor Q2 will therefore be off and transistor Q1 will be forward biased when loop current flows from left to right through resistor 52 as viewed from FIG. 2.

When d.c. loop current flows in the opposite direction through resistor 52, the voltage at the common terminal junction 98 will be more positive than the voltage at terminal 30. As a result, amplifier 53 will establish a negative voltage at its output by drawing operating current through its negative power lead 88 and not its positive power lead 82. This operating current provides forward bias for transistor Q2 and flows from the positive side of voltage supply 41 at the common 98 through resistor 90, amplifier 53, Zener diode 86 and biasing network 76 to the negative side of voltage supply 41. In this condition of operation, no operating current of any consequence is drawn by amplifier 53 through its positive power lead 82. Thus, transistor Q1 will be turned off and transistor Q2 will be forward biased when d.c. loop current flows from right to left through the current sensing resistor 52. The combined circuit of amplifier 53 and biasing networks 74 and 76 may therefore be regarded as having dual output voltages for biasing transistors Q1 and Q2, respectively.

From the circuitry thus far described it will be appreciated that amplifier 53 together with power transistors Q1 and Q2 may be regarded as a plural stage amplifier circuit 106 with feedback. In this plural stage amplifier circuit, amplifier 53 defines the input stage, and either one of the power transistors Q1 and Q2 defines the output stage. The feedback 64, rather than being a local feedback, is connected between the output of the output stage of amplifier circuit 106 and the input of the input stage of amplifier circuit 106. In the illustrated embodiment, feedback 64 is a two-stage feedback.

In this invention, amplifier circuit 106 is provided with high and low states of voltage gain. The transition from low to high gain results in an increase in the inserted boost voltage from a relatively low value to a relatively high value.

The transition of the voltage gain from its low to high level and from its high state back to its low state is accomplished by a feedback current diverting network 110 in cooperation with feedback 64. Network 110 is shown to comprise a pair of oppositely poled diodes 112 and 114 connected in parallel between a resistor 116 and the junction between feedback resistors 65 and 66. Diode 114 will conduct when current is flowing from terminal 30 to terminal 32 and that current flow exceeds a predetermined value. Diode 112 will conduct when current is flowing from terminal 32 to terminal 30 and that current flow exceeds the predetermined value. Resistor 116 is connected to the common junction 98 so that when either diode 112 or 114 conducts, most, but not all of any ensuing increases in feedback current will be diverted away from the operational amplifier's input resistor 68 to cause a step increase in the gain of amplifier circuit 106. The step increase in the gain of amplifier circuit 106 has the result of causing the power transistor in conduction (Q1 or Q2) to be driven into or close to saturation, thus significantly increasing the inserted boost voltage.

Analysis of boost circuit 12 establishes that the closed loop voltage gain, $A_V$, for the two-stage feedback amplifier circuit 106 is as follows:

$$A_V = \frac{V_{OUT}}{V_{IN}} = \frac{V_{BOOST}}{V_{IN}} = \frac{R_{66}(R_{65}/R_D + 1) + R_{65}}{R_{68}} \quad (1)$$

where $V_{OUT}$ is the voltage developed at terminal 32, $V_{IN}$ is the voltage developed across resistor 52, $R_{65}$ is the resistance of resistor 65, $R_{66}$ is the resistance of resistor 66, $R_{68}$ is the resistance of resistor 68, and $R_D$ is the series combination of resistor 116 and the dynamic resistance of the feedback current-diverting diode (112 or 114) associated with a given direction of loop current flow.

From equation (1) it is apparent that when neither of the current diverting diodes 112 and 114 is conducting the gain of the circuit will become:

$$A'_V = \frac{R_{66} + R_{65}}{R_{68}} \quad (2)$$

When either one of the current diverting diodes 112 and 114 conducts, $R_D$ reduces from a virtually infinite ohmic value to a relatively small value, depending upon the magnitude of the current flowing through the diode. Accordingly, when either of the diodes 112 and 114 conducts the gain will be increased significantly from a relative low value to a high value due to the great reduction in the value of $R_D$. Equations (1) and (2) are valid for conditions in which amplifier 53 is unsaturated.

When loop 16 is open, making the d.c. loop current zero, diodes 112 and 114, as well as diodes 92 and 94 will be in their non-conducting states. Current, however, will be supplied by voltage supplies 40 and 41 to the operational amplifier's power inputs 82 and 88 by way of biasing networks 74 and 76, respectively. As a result, a small amount of base current will be delivered to transistors Q1 and Q2 to bias transistors Q1 and Q2 slightly in conduction for an open loop condition. Thus, for the operating condition in which the d.c. loop current is zero, both of the transistors Q1 and Q2 will be conducting slightly to cause the clockwise flow of current (as viewed from FIG. 2) through the collector-emitter circuits of both power transistors.

Since there is insufficient bias to cause diodes 92 and 94 to conduct during the operating state in which loop current is zero, the base bias for transistor Q1 will be determined by the drop across both of the resistors 78 and 79, and the base bias for transistor Q2 will likewise be determined by the drop across both of the resistors 84 and 85. These resistors are sized to keep the transistor base biasing currents small so that transistors Q1 and Q2 are kept from conducting strongly when diodes 92 and 94 are nonconducting. Noise immunity is achieved by causing transistors Q1 and Q2 to conduct slightly during the open loop periods when the loop current is zero. By conducting slightly during the open loop periods in which the loop current is zero, transistors Q1 and Q2 will provide a d.c. path for conducting loop current through booster circuit 12 when the subscriber loop is closed.

Upon closure of the subscriber loop 16, the d.c. loop current is initially increased from zero to some value that is determined by the loop resistance of the loop. If the flow of this loop current is from terminal 30 to terminal 32, amplifier 53 will increase the flow of current through biasing network 74 and will decrease the flow of current through biasing network 76. If the magnitude of of this loop current flow is sufficient, the voltage across resistor 79 will reach the forward conduction voltage of diode 92. Thereafter, the voltage across resistor 79 will be clamped to the forward conduction voltage of diode 92. Under this condition, any further increase in base bias for transistor Q1 will be determined primarily by resistor 78.

Similarly, if the flow of loop current is from terminal 32 to terminal 30 upon closure of the subscriber loop 16, amplifier 53 will increase the flow of current through biasing network 74 and will decrease the flow of current through biasing network 76. If the magnitude of this current flow is sufficient, the voltage across resistor 85 will reach the forward conduction voltage of diode 94 and will be clamped to that conduction voltage. Under this condition, any further increase in base bias for transistor Q2 will be determined primarily by resistor 84.

In view of the foregoing, it will be seen that diode 92 conducts when significant current flows from terminal 30 to terminal 32. In addition, if this current flow exceeds a predetermined value, diode 114 will conduct to increase the gain of amplifier 106. It will also been seen that diode 94 conducts when significant current flows from terminal 32 to terminal 30 and that diode 112 will conduct to increase the gain of amplifier 106 if this current flows exceeds a predetermined value.

In summary, upon closure of subscriber loop 16, loop current flows through booster circuit 12. In response to this flow of loop current, booster circuit 12 will insert a variable amount of boost voltage. The magnitude of inserted boost voltage will depend upon the sensed magnitude of loop current and hence upon the existing value of loop resistance as signified by the loop current vs. loop resistance characteristic curve 120 shown in FIG. 3.

As will be described in detail presently, boost circuit 12 is responsive to a small rise in loop current above a first threshold, $I_{TH_1}$ to cause the transition of inserted boost voltage from its low variable value to its high variable value. This voltage transition begins at point A on curve 120.

Booster circuit 12 will additionally cause the transition of inserted boost voltage from its high variable value back to its low variable value in response to a small decrease in loop current from a second current threshold (indicated at $I_{TH_2}$ in FIG. 3) which is significantly greater than the first current threshold $I_{TH_1}$. The transition from high-to-low inserted boost voltage takes place at point C on curve 120.

Booster circuit 12 could be designed to place points A and C of curve 120 at the same value of loop resistance, but such a circuit tends to be unstable. Accordingly, it is desirable to design the booster circuit in such a manner that the loop resistance value $R_C$ at which the transition of high-to-low inserted boost voltage starts to take place is slightly greater than the loop resistance value $R_A$ at which the transition of low-to-high inserted boost voltages starts to take place.

In the loop current vs. loop resistance curve shown in FIG. 3, the loop current magnitudes corresponding to loop resistances $R_E$, $R_F$ and $R_G$ are indicated at $I_E$, $I_F$ and $I_G$, respectively, and the loop current magnitude at point B is indicated at $I_B$. These loop current magnitudes together with the two loop current thresholds $I_{TH_1}$ and $I_{TH_2}$ are also marked in the inserted boost voltage vs. loop current characteristic curve shown in FIG. 4. The significance of the foregoing loop resistances and their associated loop current magnitudes will be explained in detail later.

In the graph of FIG. 4, the boost voltage developed between terminals 30 and 32 by booster circuit 12 is plotted against the loop current flow through resistor 52. Except for polarity, the V-I characteristic may be the same for both positive and negative loop current shown in FIG. 4.

Operation of booster circuit 12 will now be described, assuming loop current flow from left to right through resistor 52 upon closure of loop 16.

When the loop resistance is larger than some preselected value $R_E$ (e.g., 4.7K ohms), boost voltage will be substantially removed, thus making the booster circuit adaptable to coin pay loops in which it is desired to present about a 5K ohm loop resistance to the main exchange for coin signalling without inserting booster voltage. For loop resistances between $R_E$ and some pre-selected value that is designated as $R_G$ in FIG. 3, boost voltage will be inserted upon loop closure in an amount depending upon the loop resistance. For loop resistances equal to or less than $R_G$, booster 12 operates to remove boost voltage in a manner to be explained later on.

When the loop resistance is greater than $R_A$, the loop current will increase to some value less than $I_{TH_1}$ upon closure of the loop and will cause an IR drop across resistor 52. Since this loop current flow is taken to be clockwise in loop 16 and hence from left to right through resistor 52, the voltage at the inverting input of amplifier 53 will be more negative than the voltage at the non-inverting input of the amplifier. Amplifier 53 will therefore draw increased current through biasing network 74 to develop a positive voltage at its output as previously explained. For the circuit connections shown, this amplifier output voltage will vary with the voltage drop across resistor 52 and hence with the magnitude of loop current. The current drawn by amplifier 53 through resistor 78 and, hence, the base current for transistor Q1 will vary with the sensed magnitude of loop current.

The increase in current flow through resistor 78 from the relatively small value that existed when the loop current was zero develops a voltage drop that is large enough to bias diode 92 into conduction. When this happens, the base emitter voltage for transistor Q1 will increase causing transistor Q1, which is already conducting, to conduct more strongly, but not enough to saturate the transistor. At the same time, current flow through biasing network 76 becomes negligible as previously explained, causing transistor Q2 to cut off.

The increase in the forward bias of transistor Q1 results in sufficient decrease in the transistor's collector-emitter voltage to make the sum of the collector-emitter voltage and the drop across emitter resistor 58 less than the voltage, $V_{40}$, furnished by supply 40. A series-aiding boost voltage is therefore applied across terminals 32 and 98 to increase the loop current flowing through voltage supply 40 and the collector-emitter leads of transistor Q1. The inserted boost voltage, however, will be kept relatively small for loop resistance above $R_A$ because of the action of the negative feedback 64.

By causing transistor Q1 to conduct somewhat more strongly when the loop is closed, the output voltage developed at terminal 32 will result in the flow of negative feedback current through the feedback network 64 and the operational amplifier's input resistor 68. This feedback current will vary with the inserted boost voltage at terminal 32 and performs two functions. First, it develops a voltage across resistor 68 that opposes the voltage drop across resistor 52 to control the gain of amplifier circuit 106. This latter voltage drop constitutes the source voltage for feeding amplifier 53.

In addition to the foregoing, the feedback current determines the voltage at the junction between resistors 65 and 66 and hence sets the bias for the current-diverting diodes 112 and 114.

Since the loop current is relatively small below threshold $I_{TH_1}$, the current shown by amplifier 53 through resistor 78 will also be relatively small. The base current for transistor Q1 will therefore be relatively small, making the transistor's collector-emitter voltage large. The resulting inserted boost voltage developed at terminal 32 will therefore be relatively small and hence varies with the loop current, making the magnitude of the feedback current relatively small.

As a result, the voltage drop caused by the flow of feedback current through resistors 68 and 65 back biases diode 112 and is not enough to cause any significant conduction of diode 114. All of the feedback current therefore flows through input resistor 68 to place the gain of amplifier circuit 106 in its low state.

From the foregoing, it will be appreciated that when the loop resistance is greater than $R_A$, the gain of the circuit will be in its low state, and a small amount of variable boost voltage (about 0.7 volts, for example) will be inserted across terminals 32 and 98 to increase the magnitude of loop current flowing in loop 16. Decreasing the loop resistance toward $R_A$ increases the loop current and hence the inserted boost voltage which varies in accordance with the sensed magnitude of loop current up to a loop current magnitude indicated at $I_B$ in FIGS. 3 and 4. Thus for decreasing values of loop resistance down to $R_A$, the loop current will be small and gradually rising as indicated by the section 122 of curve 120 between $R_E$ and $R_A$ in FIG. 3.

From the foregoing, it will be apparent that the voltage at terminal 32 and, hence, the magnitude of feedback current varies with the sensed magnitude of loop current as the loop resistance is decreased toward $R_A$. For values of loop current below threshold $I_{TH_1}$, the ratio of loop current to feedback current at the input of amplifier 53 will be at some relatively low substantially constant value.

When the sensed loop current rises to or above the threshold $I_{TH_1}$, the increased feedback current develops a large enough voltage drop across resistors 68 and 65 to cause diode 114 to conduct. When this happens, most of any additional feedback current will be diverted away from input resistor 68 and will be shunted by way of diode 114 and resistor 116 to the common at 98. As a result, the feedback current through resistor 68 will rise very little for rises in loop current above threshold $I_{TH_1}$ and far less that it did for corresponding increases in loop current at values below $I_{TH_1}$. Diversion of a portion of the feedback current away from resistor 68 consequently results in a step increase in the ratio of loop current to the feedback current flowing through resistor 68 when the loop current rises above threshold $I_{TH_1}$. A step increase therefore occurs in the ratio of source voltage (developed across resistor 52) and feedback voltage (developed across resistor 68), thus increasing the gain of circuit 106 to its high state as indicated by equation (1). Under these conditions, there will be a step increase in the applied voltage at the input to amplifier 53 when the sensed magnitude of loop current is increased above threshold $I_{TH_1}$.

As a result, the output of amplifier 53 rises greatly by drawing greatly increased current through resistor 78. This causes the base bias current for transistor Q1 to increase enough to drive transistor Q1 into saturation when the sensed loop current rises to the threshold $I_{TH_1}$. There consequently will be large reduction in the collector-emitter voltage to about 0.2 volts to increase in the inserted boost voltage to its maximum value which is indicated at $V_{MAX}$ in FIG. 4.

As a result, a significant step increase in loop current will take place, rising from the value $I_{TH_1}$ at point A to the value $I_B$ at point B in FIG. 3. For example, the circuit design may be such to increase the loop current from about 12.5mA at point A to about 23mA at point B. When the inserted boost voltage is at its maximum value, $V_{MAX}$, the magnitude of loop current will be at $I_B$.

When the sensed magnitude of loop current is increased above threshold $I_{TH_1}$ and approaches $I_B$, the resulting increase in applied voltage at the input to amplifier 53 is large enough to drive the amplifier into saturation. Upon saturating, amplifier 53 will be prevented from drawing more current through resistor 78 in response to further increases in loop current.

For loop current magnitudes equal to or greater than $I_B$, the source voltage across resistor 52 will be much greater than the feedback voltage across resistor 68 to maintain amplifier 53 in saturation for loop current values equal to and in excess of $I_B$.

As a result of saturating amplifier 53, the base current for transistor Q1 will not increase as loop current is increased by decreasing the loop resistance from point B in FIG. 3 to some pre-selected value indicated at $R_F$. This increase in loop current, however, increases the current through emitter and collector of transistor Q1.

Since this increase in the emitter-collector current for transistor Q1 is not accompanied by any increase in the transistor's base current, transistor Q1 will begin to come out of saturation and finally will come entirely out of saturation to resume operation in its active region upon increase in loop current to the value $I_F$ corresponding to the loop resistance value $R_F$.

Thus, for decreasing loop resistance from point B to $R_F$, loop current will continue to increase as indicated at 124 in FIG. 3, and the inserted boost voltage between terminals 32 and 98 will be at or near maximum.

As the loop resistance is decreased from $R_F$ to some pre-selected value indicated at $R_G$ in FIG. 3, the resulting increase in loop current causes transistor Q1, which is now out of saturation, to conduct less strongly. The collector-emitter voltage of transistor Q1 therefore increases to reduce the inserted boost voltage and thus partially offset the increase in loop current that results from the decrease in loop resistance. The net effect is that the loop current may rise only slightly as indicated at 126 in FIG. 3 and thus becomes approximately constant for variations in loop resistance between $R_F$ and $R_G$.

At $R_G$, the collector-emitter voltage of transistor Q1 has increased enough to make the sum of the transistor's collector-emitter voltage and the voltage drop across resistor 58 equal to voltage generated by supply 40. The inserted boost voltage across terminals 32 and 98 therefore reduces to zero.

As the loop resistance decreases from $R_G$, the resulting increase in loop current causes the collector-emitter voltage of transistor Q1 to increase still further because amplifier 53 is still in saturation, preventing an increase in the transistor's base current. As a result, the sum of the transistor's collector-emitter voltage and the drop across resistor 58 will exceed the voltage furnished by supply 40 to cause an IR drop to occur between terminals 32 and 98. This action prevents the flow of an excessive amount of loop current for relatively small values of loop resistance.

From the foregoing it is clear that a decrease in loop resistance to any value less than $R_G$ results in a reversal of the polarity of the inserted boost voltage as shown in FIG. 4. The direction of feedback current flow through feedback 64 and resistor 68 therefore reverses.

When this happens, diode 114 will turn off and diode 112 will turn on. Additionally, the feedback voltage developed across resistor 68 will change polarity so that it will be series-aiding with the source voltage developed across resistor 52. These changes, however, have virtually no effect upon the operation of the booster circuit because the large magnitude of loop current causes the voltage drop across resistor 52 to be much greater than the feedback voltage developed across resistor 68. Furthermore, the large magnitude of voltage dropped across resistor 52 is, by itself, sufficient to maintain amplifier 53 in saturation as the loop resistance is reduced below $R_G$.

For increasing loop resistance, operation of booster circuit 12 corresponds to that just described over the range extending from zero to $R_F$. Operation of the booster circuit in the resistance loop range extending from $R_F$ to an open loop condition also corresponds to that previously described with the exception that the loop current will follow the curve portion marked by the points C and D and undergoes a transition from high to low boost voltage at the second current threshold $I_{TH_2}$.

For increasing loop resistance values between $R_G$ and $R_C$, the gain of circuit 106 will be in its high state, amplifier 53 will be in saturation, and diodes 92 and 114 will be conducting. Additionally, the inserted boost voltage across terminals 32 and 98 will be at or near its maximum for loop resistance increasing from $R_F$ to point C for the reasons previously explained.

Thus, as the loop resistance increases from $R_F$, the sensed decreasing magnitude of loop current will cause transistor Q1 to be driven deeper into saturation because the collector-emitter current of transistor Q1 will be decreasing without any accompanying decrease in the transistor's base current. As point C is approached, the collector-emitter voltage of transistor Q1 will reduce to a minimum to maximize the inserted boost voltages between terminals 32 and 98.

As the loop current decreases towards threshold $I_{TH_2}$, the feedback current decreases to make the voltage at the junction between resistors 65 and 66 less positive. This voltage will be low enough to stop conduction of diode 114 when the loop current reduces to threshold $I_{TH_2}$.

When this happens, feedback current will no longer be diverted away from input resistor 68. A step decrease will therefore occur in ratio of loop current to the feedback at the inverting input of amplifier 53, establishing the transition in the gain of the circuit from its high to low states.

In response to the step decrease in this current ratio to its low value, amplifier 53 will come out of saturation. When this happens, the current drawn by amplifier 53 through resistor 78 will again vary with the sensed magnitude of loop current and will be reduced significantly since all of the current in the feedback network is now being fed through resistor 68.

As a result, the base current for transistor Q1 will be reduced by a large amount to cause transistor Q1 to come out of saturation and to resume operation in its active region upon decreasing the loop current to or below $I_{TH_2}$. The collector-emitter voltage of transistor Q1 will therefore increase greatly to cause a transition in the magnitude of the inserted boost voltage to is low state.

As the loop resistance is increased from point D, the resulting decrease in the sensed magnitude of loop current will cause transistor Q1 to conduct less, thus decreasing the magnitude of inserted boost voltage to the point where there is near or virtual cutoff as some preselected value of loop resistance such as 4.7K ohms.

The occurrence of threshold $I_{TH_2}$ at a loop current value that is greater than the lower threshold $I_{TH_1}$ is chiefly due to the absence of current flow through either of the current-diverting diodes 112 and 114 in the condition producing the low level of gain and further to the flow of current through one of the current-diverting diodes in the condition producing the high level of gain. This may have been seen from the following equation for determining the different values of $I_{TH_1}$ and $I_{TH_2}$:

$$I_{TH} = \frac{(V_D + I_D R_D) R_{68}}{(R_{52})(R_{65})} \quad (3)$$

where $V_D$ is the turn-on voltage for either diode 112 or diode 114, $R_D$ is the same as given in equation (1), $I_D$ is the magnitude of current diverted through either diode 114 or diode 112, $R_{68}$ is the resistance of resistor 68, $R_{52}$ is the resistance of resistor 52, $R_{65}$ is the resistance of resistor 65, and $I_{TH}$ equals $I_{TH_1}$ when $I_D = 0$ and further equals $I_{TH_2}$ when $I_D > 0$.

From equation (3) it is apparent that the value of $I_{TH}$ will be greater when $I_D$ is greater than zero, thus making $I_{TH_2}$ greater than $I_{TH_1}$.

For increasing loop current values up to $I_{TH_1}$ it is clear from the foregoing description that amplifier 53 will be unsaturated, and that the power transistor in conduction (i.e., Q1 or Q2) will be controlled by variations in the base biasing output voltage supplied by control circuit 46 to cause the inserted boost voltage to vary with the sensed magnitude of loop current. Above threshold $I_{TH_1}$, amplifier 53 is driven into saturation by the current-diverting action of network 110, causing maximum conduction of the power transistor and thereby maximizing the inserted boost voltage. For increasing loop current values above threshold $I_{TH_1}$ amplifier 53 remains saturated, and the boost voltage inserted by the action of the power transistor in conduction (Q1 or Q2) will vary inversely with respect to the loop current after the boost voltage is stepped up to its maximum value.

For decreasing loop current from values above threshold $I_{TH_2}$, the inserted boost voltage will increase until the loop current decreases at least to threshold $I_{TH_2}$ because amplifier 53 remains saturated until the loop currents drop to or below $I_{TH_2}$. When the loop current decreases below $I_{TH_2}$, amplifier 53 and the power transistor in conduction come out of saturation and the boost voltage is stepped down to its low state, so that for values of loop current below $I_{TH_2}$, the inserted boost voltage once again will vary with the sensed magnitude of loop current.

The operation of booster circuit 12 for counterclockwise loop current flow through loop 16 (i.e., from terminal 32 to 30 in FIG. 2) corresponds to the operation just described for clockwise loop current flow. For counterclockwise flow, however, transistor Q1 will be in cutoff, and transistor Q2 will be in conduction and will operate in the manner that transistor Q1 operated for the clockwise loop current flow. Additionally, for loop resistances equal to or greater than $R_G$, diode 112, rather than diode 114, will conduct to divert feedback current when the loop current rises above threshold $I_{TH_1}$. Thus for counterclockwise direction of loop current flow, diode 112 will be in conduction when the sensed magnitude of loop current is above the lower threshold $I_{TH_1}$. As the sensed magnitude of loop current decreases from some value at or above the loop current value at point B in FIG. 3, diode 112 will stop conducting at or just below the upper threshold $I_{TH_2}$ to stop the diversion of feedback current and consequently to decrease the gain of amplifier circuit 106 in the same manner as accomplished by the previously described operation of diode 112.

Considering the curve in FIG. 4 for positive loop current it will be seen that when the loop current is small in magnitude (i.e., below $+I_{TH_1}$) the inserted boost voltage varies with the loop current and is relatively small because both diodes 112 and 114 are nonconducting to make the gain of amplifier circuit 106 low. As the loop current increases above $+I_{TH_1}$, diode 114 begins to conduct, causing the gain of amplifier 106 to step up to its high level. As a result, the inserted boost voltage rises sharply to its maximum value $V_{MAX}$. The accompanying increase in loop current is from $I_{TH_1}$ to $I_B$.

As shown in FIG. 4, the rate at which the inserted boost voltage increases between the loop current magnitudes $I_{TH_1}$ and $I_B$ is much greater than the gradual rate at which the inserted boost voltage increases between the loop current magnitudes $I_E$ and $I_{TH_1}$. This is due to the increase in the gain of the amplifier circuit.

As the loop current continues to increase in magnitude from $I_B$, the magnitude of boost voltage decreases from its maximum, at first slowly (up to loop current $I_F$) when the conducting power transistor Q1 is still in or close to saturation, and then rapidly upon pulling the power transistor out of saturation.

As the loop current continues to increase from $I_F$ to $I_G$, the inserted boost voltage becomes less and less positive, finally reaching zero upon increasing the loop current to $I_G$. For increases in loop current beyond $I_G$, the inserted boost voltage reverses polarity and becomes negative as previously explained.

If the direction of loop current flow is from terminal 32 to terminal 30, instead of from terminal 30 to terminal 32, the inserted boost voltage as shown in FIG. 4, will be of negative polarity and will vary in the same manner just described for flow of loop current from terminal 30 and terminal 32. Loop current flow from terminal 32 to terminal 30 is shown to be of negative polarity in FIG. 4.

As previously noted, the change in feedback voltage across resistor 68 will be proportional with the change in inserted boost voltage and will change polarity in response to a change in the polarity of the inserted boost voltage. However, the ratio of the change in feedback voltage to the change in inserted boost voltage will have one predetermined value for loop current magnitudes below $I_{TH_1}$ and a lower predetermined value for loop current magnitudes above $I_{TH_1}$ because of the current diverting action of either diode 114 or diode 112. Accordingly, the change in feedback voltage per unit change in inserted boost voltage will be a first predetermined value for loop current magnitudes below $I_{TH_1}$ and will be a second and lower predetermined value for loop current magnitudes above $I_{TH_1}$.

It also will be appreciated from the foregoing description that when either one of the two diodes 114 and 112 conducts, it will have the effect of attenuating the feedback current established at the input of amplifier 53.

Furthermore, it will be appreciated that the variable collector-emitter voltage of transistor Q1 and Q2 may be considered to be a variable d.c. control voltage which is inserted in series opposing relationship with its associate boost voltage power supply 40, 41. The inserted boost voltage is therefore equal to the algebraic summation of the d.c. control voltage and the output voltage of its associated boost voltage power supply less an IR drop, as across resistor 58. Each of the boost voltage power supplies 40 and 41 is a voltage source, providing at least a substantially constant output voltage across its output terminals.

As shown in FIG. 2, a capacitor 129 is connected across terminals 30 and 32 to bypass voice frequency and other a.c. signals around booster circuit 12.

When loop 16 is closed, it will be appreciated that capacitor 129 must first be charged by the booster current before significant boost voltage can be developed. In order to speed up the charging of capacitor 129 at the time of loop closure, another capacitor 130 is connected across resistor 90 to increase the loading effect of resistor 90.

Upon closing loop 16, capacitor 130 provides a momentary short circuit across resistor 90 so that the operational amplifier's load will momentarily be increased. A large current will therefore be drawn through biasing network 74 (assuming a positive loop current flowing from terminal 30 to terminal 32) at the time of loop closure to charge capacitor 130. This current is large enough to initially drive transistor Q1 into saturation, thus maximizing the voltage across capacitor 129. Capacitor 129 will therefore be charged rapidly. A short time following the charging of capacitor 129, capacitor 130 will become charged causing the output current of amplifier 53 to flow through resistor 90. Now normal operating conditions will resume in which the current drawn through biasing network 74 is determined by the sensed magnitude of loop current in the manner previously described.

Still another capacitor 131, connected in the manner shown, forms a low pass filter 132 with resistor 70. Filter 132 establishes the upper cutoff frequency for amplifier 53 to limit the frequency to which the amplifier 53 may respond. This upper cutoff frequency is preferably selected to be low enough to prevent booster circuit 12 from responding to voice signals and a.c. ringing signals.

The disadvantage in using filter 132 to reject low frequency ringing signals is that it slows the response of booster circuit 12 to changes in operating conditions of loop 16. To overcome this disadvantage, the cutoff frequency of filter 132 may be raised above the ringing frequency and a ring disabler circuit 140 may be provided for in the manner shown in FIG. 5.

Figure 5:
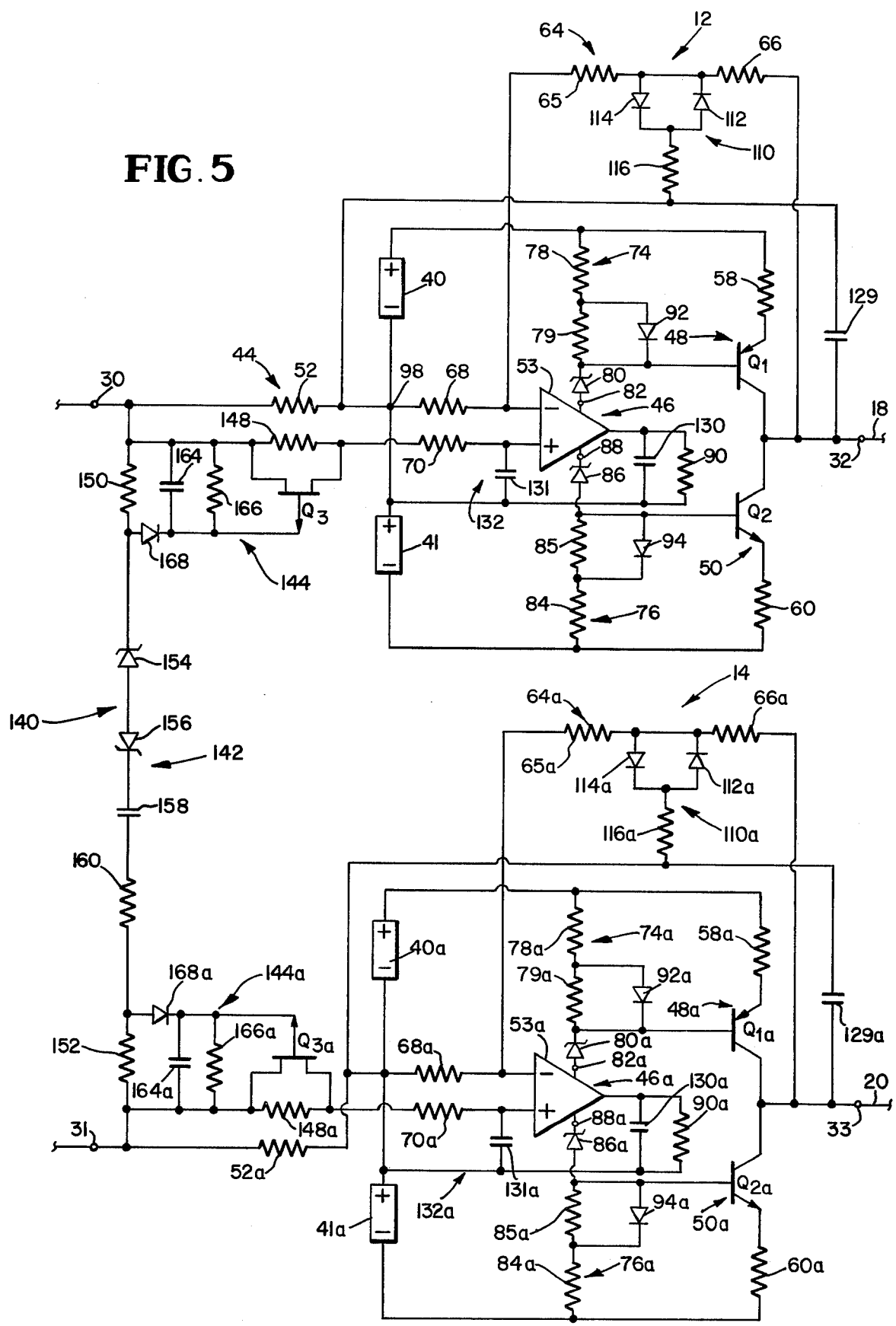
FIG. 5 is a schematic circuit diagram similar to FIG. 2, but showing the addition of the ring disabler for inserting the low pass filter resistance in response to the occurrence of the a.c. ringing signal.

In the embodiment of FIG. 5, the cutoff frequencies of filters 132 and 132a are selected to normally be higher than the frequency of the a.c. ringing signal, but still sufficiently low to reject voice signals and 60 cycle noise. The purpose of ring disabler 140 is to effectively reduce the cutoff frequencies of filters 132 and 132a to values less than the ringing frequency only during the occurrence of a ringing signal. This is accomplished by switching in additional resistances in series with resistors 70 and 70a only during the periods when a.c. ringing voltage is applied across terminals 30 and 31. As a result, the booster circuit shown in FIG. 5 has a faster response than the embodiment of FIG. 2 throughout those periods of operation in which no ringing voltage is applied to terminals 30 and 31.

As shown in FIG. 5, the ring disabler 140 comprises a circuit 142 for sensing application of ringing voltage to terminals 30 and 31 and two switching circuits 144 and 144a under the control of sensing circuit 142. Switching circuit 144 responds to the sensing of ringing voltage by circuit 142 to insert a resistor 148 in series circuit relationship with resistor 70 to increase the resistance of filter 132. Switching circuit 144a likewise responds to the sensing of ringing voltage by circuit 142 to insert a resistor 148a in series circuit relationship with resistor 70a to increase the resistance of filter 132a.

In the embodiment of FIG. 5, the sensing circuit 142 is shown to comprise a pair of current sensing resistors 150 and 152, a pair of back-to-back Zener diodes 154 and 156, a d.c. blocking capacitor 158 and a resistor 160, all connected in series between terminals 30 and 31. Diodes 154 and 156 allow current flow through resistors 150 and 152 only when the ringing voltage of relatively large amplitude is applied across terminals 30 and 31. Each of the resistors 150 and 152 develops a voltage proportional to the magnitude of ringing current flow through circuit 152. The voltage dropped across resistor 150 is applied to switching circuit 144, and the voltage dropped across resistor 152 is applied to switching circuit 144a.

In the illustrated embodiment, circuit 144 comprises a suitable switching device such as a p-channel field effect transistor Q3, a capacitor 164, a resistor 166 and a rectifying diode 168. The source and drain leads of transistor Q3 are connected across resistor 148 so that when transistor Q3 conducts it short circuits resistor 148.

In the absence of ringing voltage at terminals 30 and 31, no current flows through resistor 150. Accordingly, no voltage is dropped across resistor 150. Under this condition, the voltage at the gate of transistor Q3 will be zero. Transistor Q3 will therefore be turned on to short circuit resistor 148 and thus effectively remove it from the active circuit. Current fed in from terminal 30 under this operating condition will therefore be bypassed around resistor 148. The cutoff of filter 132 will therefore be rlatively high as previously mentioned to make the response of booster circuit 12 more rapid.

When a.c. ringing voltage is applied to terminals 30 and 31, the resulting flow of ringing current through resistor 150 develops a voltage drop across the circuit branch containing diode 168 and capacitor 164. Diode 168 conducts on the positive going alternations of the ringing signal, and the resulting half wave rectification is applied to charge capacitor 164. Positive voltage is therefore built up on the lower plate of capacitor 164 to make the gate of transistor Q3 positive enough to turn the transistor off. The bypass around the resistor 148 is therefore opened to insert resistor 148 into the active circuit in series with resistor 70. This increases the resistance of filter 132 to the sum of resistors 148 and 70. Accordingly, the filter's cutoff is decreased sufficiently to reject the ringing signal.

The a.c. ringing signal will normally have the customary, alternate ringing and silent intervals. In the silent intervals, when no ringing voltage is present, capacitor 164 discharges through resistor 166 to remove the positive voltage from the gate of transistor Q3. As a result, resistor 148 will be bypassed and hence removed from the active circuit during the silent intervals and other operational periods when no ringing voltage is applied across terminals 30 and 31 to provide booster circuit 12 with a relatively fast response to loop current changes that take place during these periods.

Switching circuit 144a is the same as circuit 144. Accordingly, like reference characters suffixed by the letter "a" have been applied to designate like components in circuit 144a. Operation of circuit 144a is the same as that just described for circuit 144 with the only exception that circuit 144a responds to the voltage across resistor 152 rather than resistor 150.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A voltage booster for supplying a d.c. boost voltage to a two wire transmission line in a telephone system and comprising a d.c. voltage supply, an amplifier circuit cooperating with said voltage supply for developing said boost voltage, feedback means connected to said amplifier circuit for controlling the gain of said amplifier circuit, and means connected to and cooperating with said feedback means for increasing said gain in response to a rise in the magnitude of direct current flowing in said line above a pre-selected threshold, and said amplifier circuit having means providing a connection to said line for applying said boost voltage thereto and being rendered effective by said increase in said gain for increasing the magnitude of the boost voltage applied to said line.

2. A voltage booster for supplying a d.c. boost voltage to a transmission line in a telephone system and comprising a d.c. voltage supply, an amplifier circuit cooperating with said voltage supply for developing said boost voltage, feedback means controlling the gain of said amplifier circuit, and means connected to and cooperating with said feedback means for decreasing said gain in response to a decrease in the magnitude of direct current flowing in said line below a pre-selected threshold, and said amplifier circuit having means providing a connection to said line for applying said boost voltage thereto and being rendered effective by said decrease in said gain for decreasing the magnitude of the boost voltage applied to said line.

3. A voltage booster for supplying a d.c. boost voltage to a two wire transmission line in a telephone system and comprising a d.c. voltage supply, an amplifier circuit cooperating with said supply for developing said boost voltage, said amplifier circuit having means connecting the voltage supply in series with a conductor of said line for applying said boost voltage to said line and for providing said boost voltage with a magnitude that varies with the gain of the amplifier circuit, and a further circuit for controlling the gain of said amplifier circuit, said further circuit including a negative feedback means for said amplifier circuit and being rendered effective by a rise in the magnitude of direct current flowing in said line above a first pre-selected threshold to cause a step increase in said gain for increasing said boost voltage, and said further circuit also being rendered effective by a decrease in direct current flowing in said line below a second pre-selected threshold to cause a step decrease in said gain for decreasing said boost voltage, said second threshold being greater than said first threshold.

4. The voltage booster defined in claim 3 wherein said means connecting said voltage supply in series with a conductor of said line comprises an active device connected to conduct said direct current through said voltage supply to said line.

5. The voltage booster defined in claim 4 wherein said amplifier circuit has a plurality of amplifier stages, wherein said active device defines the output stage of said amplifier circuit, and wherein said feedback means is connected between the output of said amplifier circuit and the input of said amplifier circuit.

6. The voltage booster defined in claim 5 wherein said further circuit comprises means connected to said feedback means for (a) diverting feedback current away from said feedback means in response to an increase in the magnitude of said direct current above said first pre-selected threshold to cause said step increase in said gain and (b) discontinuing the diversion of the feedback current away from said feedback means in response to a decrease in the magnitude of the direct current below said second preselected threshold to cause said step decrease in said gain.

7. The voltage booster defined in claim 5 wherein said further circuit includes means connected to said feedback means for (a) diverting feedback current away from said feedback means in response to an increase in the magnitude of said direct current above said first pre-selected threshold to effect a step increase in the ratio of said direct current to the feedback current established at the input of said amplifier circuit and to thereby cause said step increase in said gain and (b) discontinuing the diversion of the feedback current away from said feedback means in response to a decrease in the magnitude of said direct current below said second pre-selected threshold to effect a step decrease in the ratio of said direct current to the feedback current established at the input of said amplifier circuit to thereby cause said step decrease in said gain.

8. The voltage booster defined in claim 4 wherein said active device is a transistor variably controlling the magnitude of said boost voltage, and wherein said amplifier circuit further includes a control means, and said transistor being under the control of said control means to vary the magnitude of said boost voltage in accordance with the magnitude of said direct current when the magnitude of said direct current is less than said first pre-selected threshold.

9. A voltage booster for supplying a d.c. boost voltage to a two wire transmission line in a telephone system and comprising a d.c. voltage supply, a plural stage feedback amplifier circuit cooperating with said supply for developing said boost voltage, said amplifier circuit having an output stage connecting the voltage supply in series with a conductor of said line for applying said boost voltage to said line and providing said boost voltage with a magnitude that varies with the gain of the amplifier circuit, said amplifier circuit further including an input stage, a negative feedback network forming a part of said amplifier circuit and connected between the output of said output stage and the input of said input stage of said amplifier circuit, and a gain-controlling feedback current diverting circuit connected to said feedback network and rendered effective by an increase in the magnitude of direct current flowing in said line above a pre-selected threshold for diverting feedback current away from said feedback network to cause a step increase in the voltage gain of said amplifier circuit.

10. A voltage booster for supplying a d.c. boost voltage to a two wire transmission line in a telephone system and comprising a d.c. voltage supply, a feedback amplifier circuit cooperating with said supply for developing said boost voltage, said amplifier circuit having an active device connecting the voltage supply in series with a conductor of said line for applying said boost voltage to said line and providing said boost voltage with a magnitude that varies with the gain of the amplifier circuit, negative feedback means forming a part of said amplifier circuit, and means cooperating with said feedback amplifier circuit for (a) diverting feedback current away from said feedback means to cause a step increase in said gain in response to an increase in the magnitude of direct current flowing in said line above a first pre-selected threshold and (b) further for discontinuing the diversion of said feedback current to cause a step decrease in said gain in response to a decrease in the magnitude of said direct current below a second pre-selected threshold that is greater than said first pre-selected threshold.

11. A voltage booster adapted to be connected to a two wire transmission line in a telephone system for supplying a variable boost voltage to increase the magnitude of direct current flowing in said line, comprising first and second terminals, a d.c. voltage supply, an amplifier circuit cooperating with said supply for developing said boost voltage, said amplifier circuit having an input and providing for the connection of said voltage supply intermediate said first and second terminals to apply said variable boost voltage between said first and second terminals, current sensing means for establishing a control signal that varies with the magnitude of direct current flowing in said line, and means for applying said control signal to said input, said amplifier circuit comprising (a) feedback means for establishing at said input a feedback signal that varies with said boost voltage, and (b) means for controlling the magnitude of said boost voltage as a function of said control and feedback signals.

12. The voltage booster defined in claim 11 wherein said means of said amplifier circuit is responseive to said control signal to cause said boost voltage to increase as the magnitude of said direct current increases when the magnitude of said direct current is below a predetermined value, said voltage booster further comprising means rendered effective upon a rise in the boost voltage to a value corresponding to a pre-selected magnitude of said direct current for attenuating said feedback signal.

13. The voltage booster defined in claim 12 wherein said attenuating means comprises a current-diverting circuit connected to said feedback means for diverting feedback current flowing in said feedback means away from said feedback means.

14. The voltage booster defined in claim 13 wherein said feedback means is connected between the input of said amplifier circuit and said second terminal to cause said feedback current to vary with the magnitude of said boost voltage.

15. The voltage booster defined in claim 14 wherein said feedback means includes a resistor through which feedback current flows for causing a voltage drop that varies with the magnitude of the feedback current, and wherein said current-diverting circuit is connected to a terminal of said resistor and comprises a diode that is biased into conduction by an increase in said voltage drop to a predetermined value to divert a portion of the feedback current.

16. The voltage booster defined in claim 15 wherein said diode is connected intermediate said terminal of said resistor and a terminal of said voltage supply.

17. The voltage booster defined in claim 14 wherein said current-diverting circuit is connected intermediate said feedback means and a terminal of said voltage supply.

18. The voltage booster defined in claim 11 wherein said means controlling the magnitude of said boost voltage comprises an input amplifier stage and output amplifier stage, said input amplifier stage being connected to said current sensing means by said control signal-applying means, said output amplifier stage being connected intermediate said voltage supply and said second terminal to conduct said direct current, and said feedback means being connected between the output of said output amplifier stage and the input of said input amplifier stage.

19. The voltage booster defined in claim 11 further comprising an a.c. bypass for bypassing voice signals and a.c. ringing signals around said feedback amplifier circuit, a low pass filter arranged at the input of said amplifier circuit and having a cutoff frequency that is normally above the frequency of the a.c. ringing signal in absence of the ringing signal, and a further circuit responsive to the application of a.c. ringing signal voltage to reduce the cutoff frequency of the filter to a value below the frequency of the ringing signal only during the application of the ringing signal.

20. The voltage booster defined in claim 19 wherein said filter is electrically connected between an input terminal of said amplifier circuit and said further circuit, and wherein said further circuit is connected between said amplifier circuit and a further terminal to which said a.c. ringing signal is fed from a central office.

21. The voltage booster defined in claim 20 wherein said filter has a resistance that determines in part the cutoff frequency of said filter, and wherein said further circuit is effective to change the magnitude of said resistance in response to the application of said ringing signal.

22. The voltage booster defined in claim 20 wherein said filter has a resistor that is connected to an input terminal of said feedback amplifier circuit, wherein the frequency cutoff of said filter is variable by insertion of additional resistance in series with said resistor, and wherein said further circuit comprises a further resistor connected in series between the resistor of said filter and a further terminal to which the a.c. ringing signal current is fed, a normally conducting switching device electrically connected across said further resistor to complete a current bypass around said further resistor in absence of application of an a.c. ringing signal to said further terminal, and means responsive to the application of the a.c. ringing signal to said further terminal to render said switching device non-conductive to open said current bypass and causing current flowing through the resistor of said filter to also flow through said further resistor.

23. A voltage booster adapted to be connected to a two wire transmission line in a telephone system for supplying a variable d.c. boost voltage to increase the magnitude of direct current flowing in said line, comprising first and second terminals, a d.c. voltage supply, and circuit means cooperating with said supply for developing said variable boost voltage between said first and second terminals, said circuit means comprising current sensing means for producing a control signal that is proportional to the magnitude of direct current flowing in said line, first amplifier means having an input connected to said current sensing means to produce an output voltage that varies as a function of said control signal, second amplifier means biased by said first amplifier means and connected intermediate said voltage supply and said second terminal to vary said boost voltage as a function of said output voltage, and feedback means connected between the output of said second amplifier means and the input of said first amplifier means for establishing a feedback signal which varies with the magnitude of said boost voltage and which is in series opposing relationship with said control signal at said input for a pre-selected polarity of said boost voltage.

24. A voltage booster adapted to be connected to a two wire transmission line in a telephone system for supplying a variable d.c. boost voltage to increase the magnitude of direct current flowing in said line, comprising first and second terminals, and a boost voltage circuit for establishing said boost voltage across said terminals and including a d.c. voltage source providing a constant output voltage, and means for connecting said source intermediate said terminals and for inserting a variable d.c. control voltage in series opposing relationship with said output voltage intermediate said terminals to provide said boost voltage with a magnitude that varies with the algebraic summation of said output voltage and said d.c. control voltage, said means being under the control of direct current flowing in said line to provide variations in said control voltage that cause said boost voltage to (a) increase as said direct current increases from a first predetermined value to a second predetermined value, (b) to also increase as said direct current increases from said second predetermined value to a third predetermined value, but at such a rate that the change in the boost voltage per ma increase in said direct current between said second and third values is greater than the change in boost voltage per ma increase in said direct current between said first and second predetermined values, and (c) to decrease as said direct current increases above said third predetermined value.

25. A voltage booster adapted to be connected to a two wire transmission line in a telephone system for supplying a variable d.c. boost voltage to increase the magnitude of direct current flowing in said line, comprising first and second terminals, a boost voltage circuit for establishing said boost voltage across said terminals and comprising a d.c. voltage source providing a constant output voltage, and means for connecting said source intermediate said terminals and for inserting a variable d.c. control voltage in series opposing relationship with said output voltage intermediate said terminals to provide said boost voltage with a magnitude that varies with the algebraic summation of said output voltage and said d.c. control voltage, said means being under the control of the direct current flowing in said line to provide variations in said control voltage that cause said boost voltage to (a) increase as said direct current increases from a first predetermined value to a second predetermined value, (b) to also increase as said direct current increases from said second predetermined value to a third predetermined value, but at such a rate that the change in the boost voltage per ma increase in said direct current between said second and third values is greater than the change in boost voltage per ma increase in said direct current between said first and second predetermined values, (c) to decrease as said direct current increases from said third predetermined value to a fourth predetermined value, and (d) to also decrease as said direct current increases above said fourth predetermined value by such a rate that the change in boost voltage per ma increase in said direct current above said fourth predetermined value is greater than the change in boost voltage per ma increase in said direct current between said third and fourth predetermined values.

26. A voltage booster adapted to be connected to a two wire transmission line in a telephone system for supplying a variable d.c. boost voltage to increase the magnitude of direct current flowing in said line, comprising first and second terminals, a d.c. voltage supply source, an amplifier circuit having means providing for the connection of said source intermediate said terminals and cooperating with said source to establish said boost voltage across said terminals, current sensing means for sensing the magnitude of direct current flowing in said line to establish a d.c. control voltage that varies with the magnitude of said direct current, means for applying said control voltage to the input of said amplifier circuit, feedback means connected to said amplifier circuit for establishing at said input a feedback voltage that varies with said boost voltage, said amplifier circuit further including means for controlling said boost voltage as a function of said control and feedback voltages, and means connected to said feedback means for setting the ratio of the change in said feedback voltage to the change in boost voltage at a first predetermined value when said direct current is below a first predetermined magnitude and further for setting said ratio at a second predetermined value which is less than said first predetermined value when said direct current is above a second predetermined magnitude that is greater than said first predetermined magnitude.

* * * * *